INVENTOR.
HEINZ F. MOELLMANN
BY
ATTORNEYS.

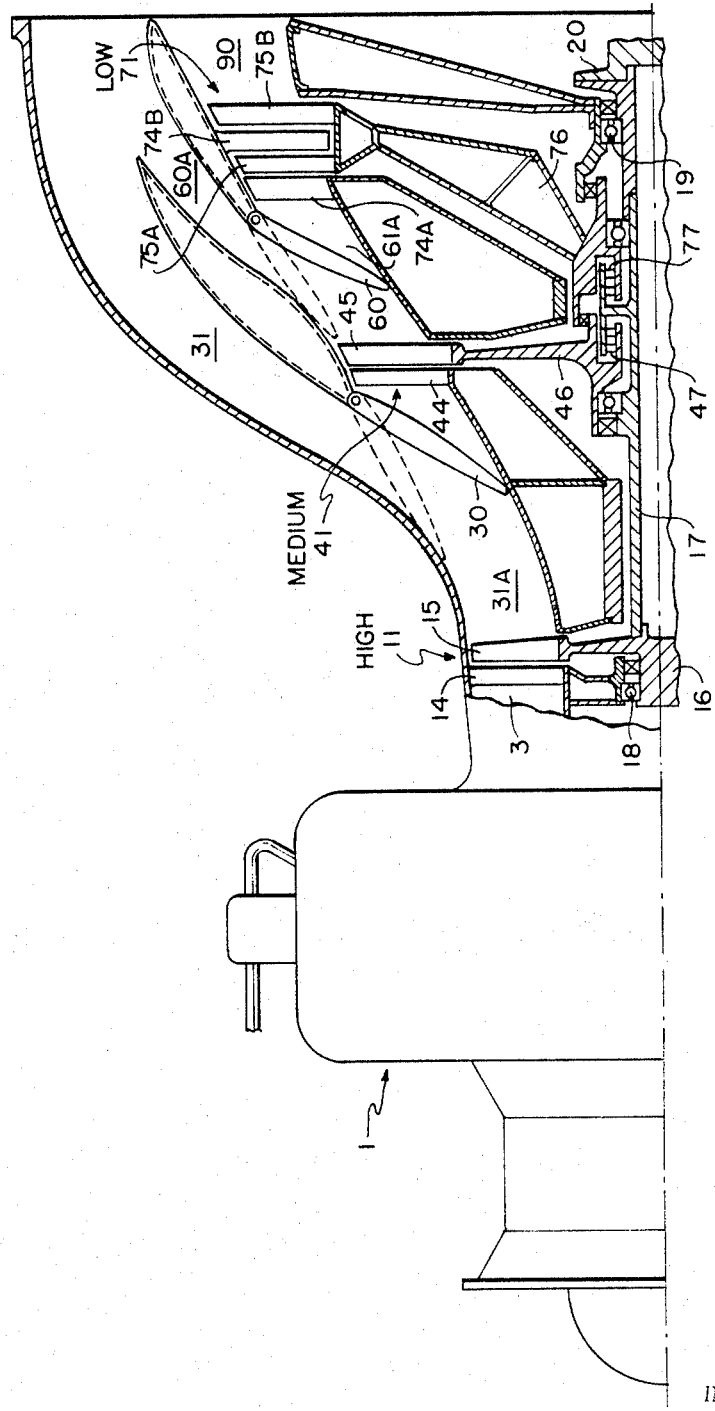

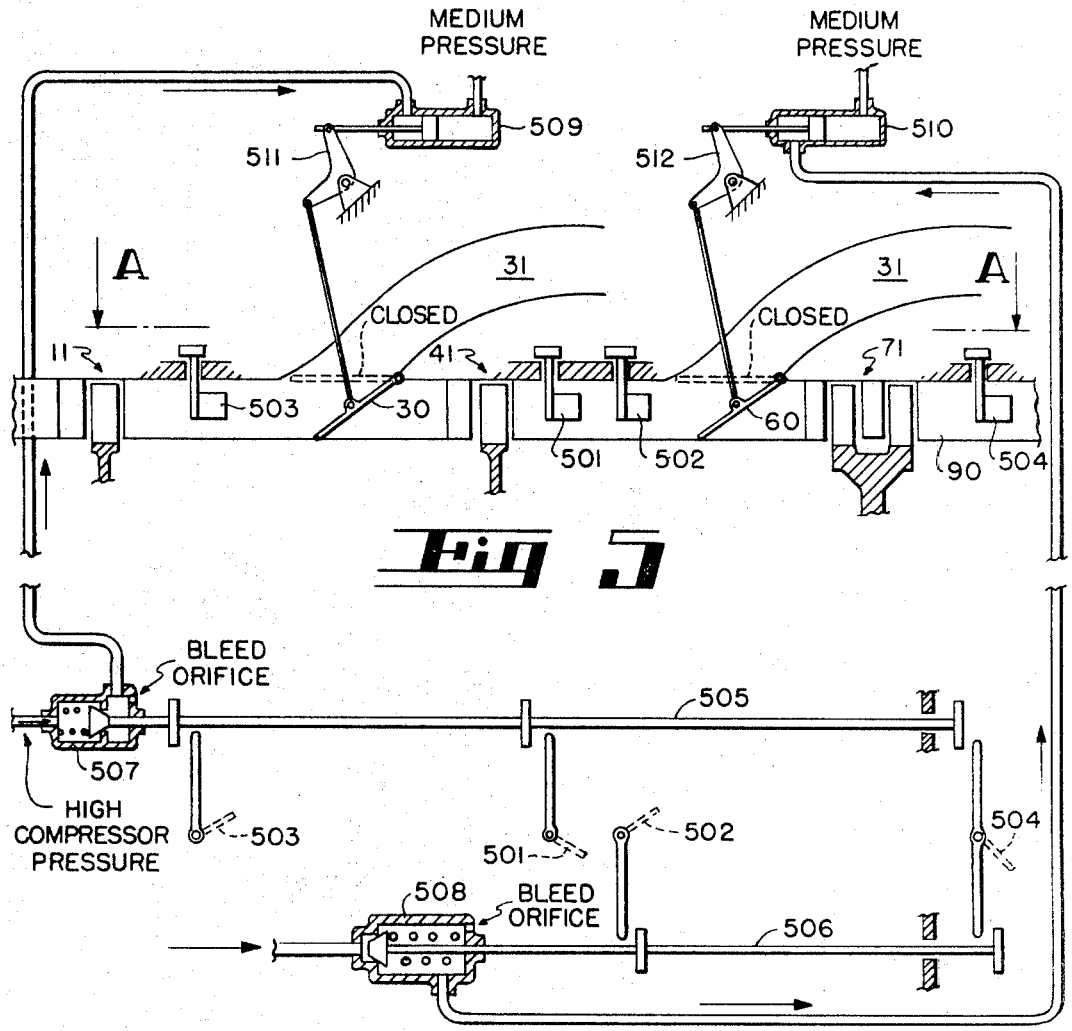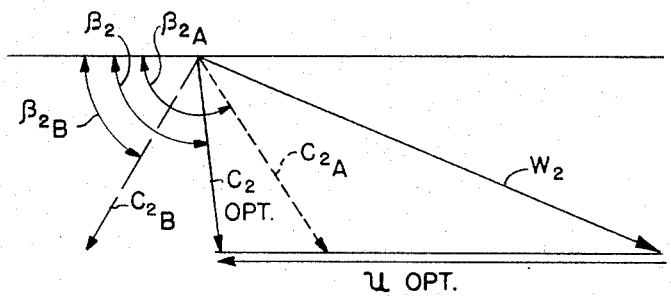

United States Patent Office 3,472,487
Patented Oct. 14, 1969

3,472,487
WIDE SPEED RANGE GAS POWER CONVERTER
Heinz Moellmann, New Haven, Conn., assignor to Avco Corporation, Stratford, Conn., a corporation of Delaware
Filed Oct. 6, 1967, Ser. No. 673,366
Int. Cl. F01d 1/04, 17/06; F02c 3/00
U.S. Cl. 253—69                    10 Claims

ABSTRACT OF THE DISCLOSURE

The illustrative disclosure includes three sets of turbine wheels each designed for maximum efficiency over a certain portion of the speed range over which the power plant is intended to operate and control mechanisms are provided to assure that the turbine most suited for the speed and power conditions experienced at any one time is put in operation under those conditions. The controls also afford mechanism which will, under certain conditions, put one, two, or three of the turbines in operation at the same time depending upon the combination which will obtain maximum efficiency.

One of the results is the substitution of a series of turbine designs of varying characteristic to accomplish the function which would otherwise require variation in gear ratios to obtain the desired torque speed characteristic of the output shaft while maintaining the turbine operating at near its maximum efficiency.

BACKGROUND OF THE INVENTION

Ground and water vehicles, in particular, tanks, trucks, and hydroplanes, require maximum available power over a wide range of speed. In addition, to obtain best economy over a wide range, the power plant speed must be properly matched with the output level. Manual and automatic torque converters and variable speed transmissions have been commonly in use for piston engine ground vehicles. The disadvantages of variable speed transmissions are well known.

The ratio of maximum to minimum rotative speed in the range over which the power stays nearly constant at a given power setting is approximately 1.6 in a gas turbine engine of the so-called free power turbine type. This means a separate turbine wheel driving the air compressor from that used to drive the power output shaft and such a type of device is well known in the art. The present disclosure, however, provides a series of turbine wheels designed to operate at maximum efficiency over respectively high, medium, and low portions of the speed range and such an arrangement permits an increase in the so-called stall torque ratio from approximately 2 to a figure of 6 or more and the useful operating speed range over which maximum power can be kept nearly constant can be on the order of 5 or more. In addition, the turbine design permits optimum part load operation over a similar wide speed range.

SUMMARY

An efficient and improved wide speed range gas power converter is afforded having a plurality of turbine stages for driving an output shaft with at least one turbine wheel for each stage each designed to operate at optimum output torque over a certain portion of a desired wide range of output speed of rotation; with individual control means responsive to rotative speed of each of the turbine wheels, and having means to direct and to shut off driving gas flow selectively to certain of the turbine wheels responsive to said individual control means so constructed and arranged that gas flow to an individual turbine wheel is shut off when speed of rotation of such wheel exceeds the portion of the range corresponding to optimum output for such wheel.

DRAWINGS

FIGURE 1 is a cross-section of the turbine section of a gas turbine power plant employing a power converter with three turbine wheels designed for driving an output shaft, the turbine wheels representing optimum speed ranges of high, medium, and low with valve means to control flow of gas to such wheels.

FIGURES 5 and 5A are schematic drawings of the control.

FIGURE 6 is a velocity vector diagram showing use of gas flow direction for the control.

DESCRIPTION

Figure 3:
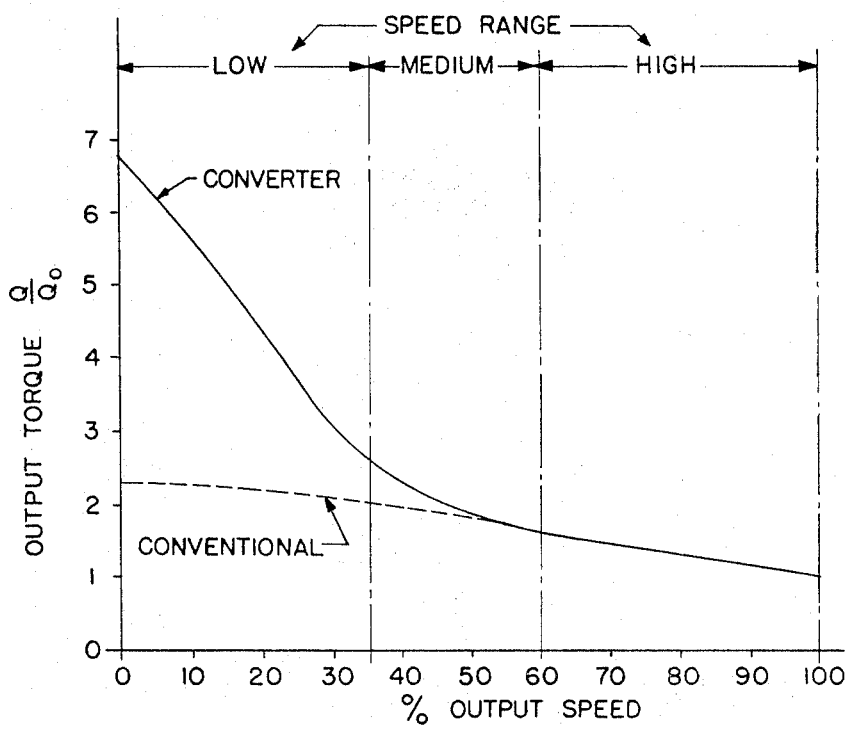
FIGURE 3 is a graph showing comparison of conventional free power turbine and the mechanism in this invention as relates to the output torque at a given speed of rotation.

The basic features of a power plant employing the power converter of the type disclosed in this invention are shown in FIGURE 1. A conventional gas producer 1 of a type well known in the art of gas turbine construction is used to produce hot gas energy resulting from a combination of air under pressure, and injected fuel ignited in a combustor where burning takes place and hot gas is ejected at the exit duct 3, it being assumed that the gas producer is automatically controlled to supply a desired energy flow of hot gas to drive the turbine unit of the gas power converter shown in FIGURE 1. To illustrate the basic concept of the power converter, FIGURE 1 shows a power turbine stage 11 comprising stators 14, turbine buckets 15 and rotor 16. The turbine buckets 15 are blades provided with aerodynamic shape and angle setting relative to the plane of rotation of the wheel so that maximum turbine efficiency is obtained in the high portion of the speed range over which this power converter is designed to operate. The rotor 16 is rigidly connected to a power output shaft 17. This shaft 17 is supported by bearings 18 and 19; the bearings support structure and overall housing not being shown in detail. At the output end of the shaft 17, there is a coupling 20 which may connect the shaft with power absorbing devices such as boat propellers or power trains of ground vehicles, etc.

A bypass valve 30 positioned in the outlet channel 31A behind the turbine stage 11, when it is open as shown in FIGURE 1, allows the hot gas to escape through the exhaust duct 31. But when this valve 30 is closed as shown by the dotted lines in FIGURE 1, the gas in the channel 31A is thus allowed to flow into a second turbine stage 41 which has stators 44, turbine buckets 45 and rotor 46. The turbine buckets 45 of the power turbine stage 41 are so designed and positioned relative to the plane of rotation of the rotor 46 as to operate at their maximum efficiency in the medium range of speed of rotation for which this power converter is designed. The rotor 46 of this medium speed turbine 41 is connected to shaft 17 through a free-wheeling clutch 47 so that the rotor 46 will only transmit drive to the shaft 17 when its speed of rotation is greater than the shaft 17 and will "free-wheel" when there is a greater speed of rotation in the shaft 17 than is imparted by the rotor 46. This free-wheeling arrangement insures that the drive is effective only in the direction from the rotor 46 to the shaft 17 and never in the direction from the shaft 17 to drive the rotor 46. After passing through the power turbine 41 the hot gas may escape through the bypass 60A or with this valve 60 closed (dotted lines) will flow into the duct 61A. The gas will continue in the channel 61A into a third power turbine stage 71. This turbine is designed to produce its maximum efficiency in the lowest portion of the speed range selected for this wide range power converter. The turbine 71 may be a two-stage turbine, as is generally more satisfactory for low speed operation, as shown in FIGURE 1, with stators 74A and 74B, buckets 75A and 75B and rotor 76 which is again connected through a free-wheeling clutch 77 to the power output shaft 17 in the same manner as described for the medium speed range turbine 46. After passing through the turbine 71, the gas will pass to the exhaust duct 90.

The layout of the gas power converter is such that the turbine stages when engaged in driving relationship with the output shaft 17 will operate in the high efficiency range, providing there is a torque output of each turbine nearly proportional to the gas producer exit energy and reversely proportional to the speed of rotation.

The proper engagement sequence of the power turbines to accomplish this purpose is automatically insured by satisfactory control of the bypass valves 30 and 60 by the sensing devices as hereinafter described. The bypass valves 30 and 60 are here considered closed when the gas cannot escape through the corresponding exhaust duct and is allowed to flow freely to the following turbine stage (dotted lines).

The controls described below assure that during low speed operations all three turbines are operating and utilizing energy from the hot gas. In the medium speed range, only the high and medium speed range turbines are in operation, while in the high speed range only the high speed turbine converts gas energy. For a better understanding of the arrangement, FIGURES 2, 3, and 4 are provided showing certain relationships as follows:

FIGURE 3 shows a typical torque speed diagram of the wide speed range gas torque converter herein disclosed. $Q/Q_0$, that is, output torque over output torque at maximum speed, is plotted against percentage of speed output and curves are shown for the wide range gas power converter of this disclosure, as well as a comparison curve showing conventional free powered turbine arrangement. The range of low, medium, and high speeds is also shown.

Figure 2:
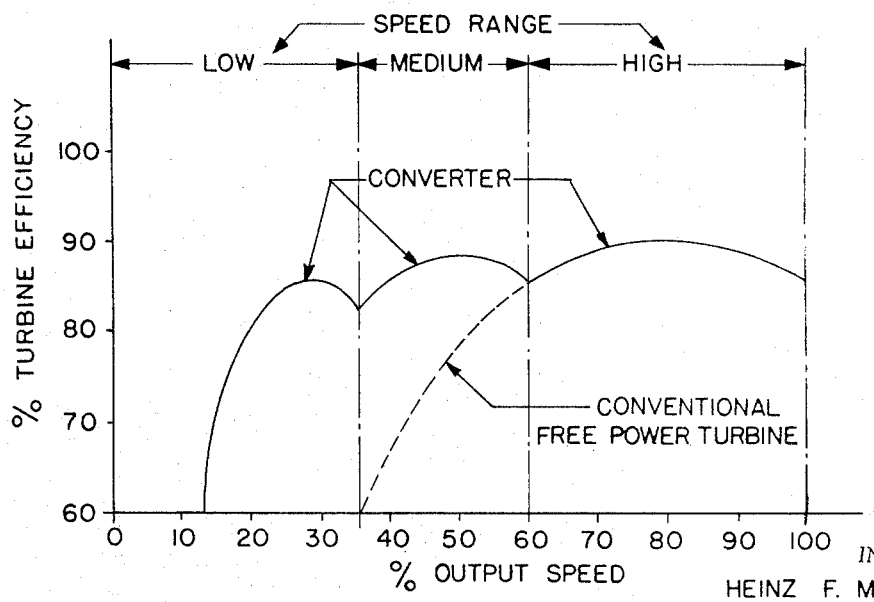
FIGURE 2 is a graph showing comparison of turbine efficiency at various values of output speed in percentage of maximum speed comparing the efficiency of the conventional free power turbine with the wide range power converter of this invention.

FIGURE 2 shows corresponding curves plotting turbine efficiency against percentage of output speed. The free power turbine conventional curve is shown, which is continued for the high speed range portion of the wide range converter. In other words, the turbine 11 would be comparable with the high speed range, while in the medium speed range the high portion for the turbine wheel 41 is shown which is the turbine designed to have its maximum efficiency in the medium speed range, while the low speed which corresponds to the turbine 71, the low speed turbine, is the one designed for maximum efficiency in the low portion of the speed range.

Figure 4:
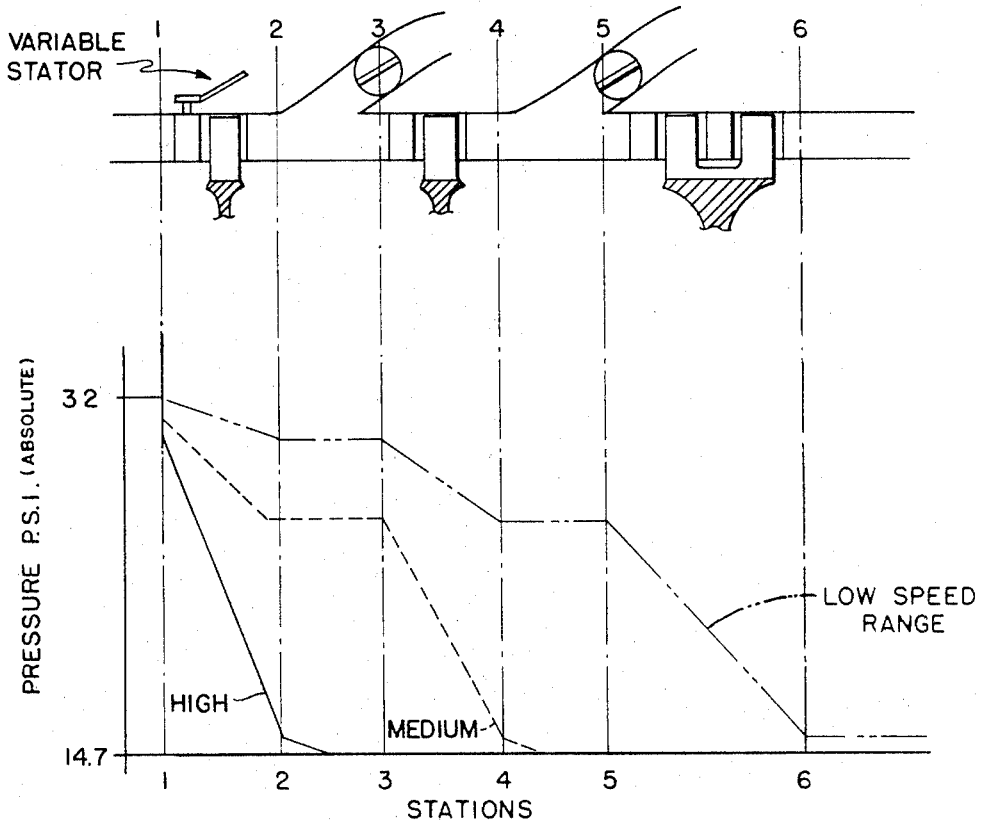
FIGURE 4 shows relative pressure values at the several stations 1 through 6.

FIGURE 4 gives the turbine stage pressures at maximum speed for high, medium, and low speed range in the various speed ranges showing the pressures experienced at the various stations.

A sensing device for operation of the bypass valves 30 and 60 is shown in FIGURES 5 and 5A. The sensing devices consist of four gas flow velocity sensors 501, 502, 503, and 504 which act against valve rods 505 and 506. The poppet valves 507 and 508 are servo valves for the power amplifiers 509 and 510 which operate the bypass valves 30 and 60, respectively, through the respective linkages 511 and 512.

The sensors 501, 502, 503, and 504 comprise vanes which can follow the turbine exit gas stream angles within the limits determined by adjustable stops (not shown) and the end positions of valves 507 and 508, respectively. The concept of the operation utilizes the fact that the direction of the gas flow stream behind the turbine stages changes with a change of turbine speed for a given gas producer power setting. In order to demonstrate the basic principle, a velocity vector diagram of the exit velocities of the gas flow after turbine 41 is shown in FIGURE 6. The vector $W_2$ represents the relative gas velocity at the exit of the rotor blade, $U_{opt}$ the optimum blade velocity, $C_{2_{opt}}$ the resultant absolute gas exit velocity at optimum turbine efficiency. Vector $C_{2_A}$ represents the exit velocity at the minimum shaft speed of the desirable operation speed range of turbine 41 and $C_{2_B}$ is the vector for the maximum shaft speed of the range. The angles $beta_{2_A}$ and $beta_{2_B}$ are the corresponding velocity vector angles. When the gas flow angle becomes smaller than $beta_{2_B}$, output speed above the desired speed range of the power turbine stage 41 is indicated. This angle by the sensor 501 (see FIGURE 5) allows the bypass valve 30 rearward of the turbine 11 to open as shown in the solid lines of FIGURE 1 and FIGURE 5 and to bypass the hot gas into the exhaust channel 31 and thus to effect the shutoff of the adjacent, medium speed range, overspeeding turbine stage 41.

On the other hand, when the velocity vector angle exceeds the pre-set $beta_{2_A}$ value, the sensor 502 directs the bypass valve 60 rearward of the medium turbine stage 41 to close and to supply the turbine stage 71 with high energy gas. This causes the turbine stage 71 to engage through its overrunning clutch with the output shaft 17 so that all turbine stages 11, 41 and 71 operate at their best efficiency range.

The sensing devices have built-in hysteresis to provide for sufficient speed overlap which avoids hunting when the vehicle is operating near the valve switching speed range.

Similarly the velocity vector angle sensor 503 behind turbine 11 senses an increase of the velocity angle beyond the pre-set value $beta_{2_A}$ and effects the closing of value 30 when the output speed falls below the desired speed range of turbine 11. Sensor 504 senses the velocity vector behind turbine 71 and insures that the valves 30 and 60 are closed when the velocity vector angle exceeds the pre-set value of $beta_{2_B}$ of turbine 71.

Valve 30 is kept closed, as long as at least one of the 3 sensors 501, 503, or 504 direct it to be closed; valve 60 is kept closed as long as at least one of sensors 502 or 504 demand its shutoff. In this way continuous and smooth switching operations are insured in the proper sequence over the total speed and power range.

It is thus apparent that the controls above described will assure that the turbine corresponding to the r.p.m. value of the speed range in operation will be the turbine designed for maximum efficiency with that speed range and in case of the rotation of the unit being in the high speed range, the high speed turbine 11 will be the only one in operation; the others will be by-passing gas to the exhaust. When the speed range of about 37–60% medium speed range is experienced, both the high speed range turbine 11 and the medium speed range turbine 41 will be in operation, while with the low speed, below 37% of output speed, all three turbines will be in opeartion incuding the turbine 71 particularly designed for this range. In other words, it is assured not only that the turbine corresponding to the speed range is in operation, but that there is no turbine in the series which is operating at a speed above that for which it is designed.

I claim:
1. In a wide speed range gas power converter having a plurality of power turbine stages:
    said stages designed for optimum efficiency of operation at various speeds of rotation;
    with said first stage turbine designed for optimum efficiency at highest speed of rotation and subsequent stages designed for progressively lower speeds of rotation;

valve means between said stages for deflecting fluid flow from subsequent stages thereby to use turbine stages in relationship to speed of rotation;

control means responsive to change in velocity of fluid flow rearward of certain of said turbine stages; and connections from said fluid flow responsive control means to actuate said valve means between said stages to selectively operate said valve means to cause gas flow to actuate certain of said turbines.

2. In a wide speed range gas power converter having a plurality of power turbine stages for driving an output shaft;

a series of turbine wheels, at least one for each of said stages, each designed to opreate at optimum output torque over a certain portion of a desired wide range of output shaft speed of rotation;

individual control means responsive to rotative speed of each of said turbine wheels;

valve means to direct and to shut off a driving gas flow selectively to certain of said turbine wheels responsive to said individual control means, so constructed and arranged that gas flow to an individual turbine wheel is shut off when speed of rotation of such wheel exceeds the portion of the range corresponding to optimum output for such wheel.

3. Mechanism as in claim 2 in which:

said valve means and said individual control means are so constructed and arranged that gas flow to a turbine adjacent a turbine designed for a higher optimum speed of rotation is directed to actuate said adjacent turbine when the speed of rotation of a wheel previously actuated by gas flow and designed for next higher portion of speed range assumes a speed of rotation below the range of designed optimum output for such previously actuated turbine.

4. In a wide speed range gas power converter having a driven shaft and a plurality of turbine stages comprising:

a first turbine stage including a turbine wheel secured to rotate said driven shaft;

one or more additional turbine stages each having a turbine wheel designed for most efficient operation at successively lower speeds of rotation than said first turbine stage;

an overrunning clutch operable with each of said additional turbine stage wheels to connect each said wheel with said driven shaft in the direction imposing a drive from the respective turbine wheel to said shaft;

valve means operable to selectively direct gas flow to said additional turbine wheels;

control means responsive to variation in a direction of flow rearward of each of said turbine stages and operable to selectively control said valve means, so constructed and arranged as to direct gas flow through said turbine stages in a definite relationship to the speed of rotation of said driven shaft.

5. In a wide speed range gas power converter:

an output connection;

a series of turbine wheels each designed to develop a characteristic optimum torque over a limited speed range in steps of successively lower speeds of rotation thereby to provide a series of wheels covering a selected relatively wide range of rotative speeds;

the combination with the aforesaid structure of means to selectively connect said turbine wheels in driving relationship with said output connection;

gas flow directing structure for selectively directing gas flow to rotate said turbine wheels;

control means responsive to speed of rotation of each of said turbine wheels;

connections from said control means to said gas flow directing means so constructed and arranged as to cause a turbine of said series designed for a given speed range to be put in driving relationship with the said output shaft during the time such speed range is effective.

6. In a wide speed range gas power converter as in claim 5 in which:

said gas flow directing structure includes valve means to direct and to shut off a driving gas flow selectively to certain of said turbine wheels responsive to said control means, so constructed and arranged that gas flow to an individual turbine wheel is shut off when speed of rotation of such wheel exceeds the range of design optimum output for said such wheel.

7. In a wide speed range gas power converter as in claim 6 in which:

said valve means and said individual control means are so constructed and arranged that gas flow to turbine wheel adjacent a turbine wheel designed for higher optimum speed of rotation is directed to actuate such adjacent turbine wheel when the speed of rotation of such turbine wheel previously actuated by gas flow assumes a speed of rotation below the range of design optimum output for such previously actuated turbine wheel.

8. In a wide speed range gas power converter having a driven shaft and a plurality of turbine stages comprising:

a first turbine stage including a turbine wheel secured to rotate with said driven shaft; and at least one additional turbine stage having a turbine wheel designed for most efficient operation at a successive lower speed of rotation than said first turbine stage;

overrunning clutch means connected to couple said additional turbine wheel to drive said output shaft only when drive is from such turbine wheel to said shaft;

control means directing flow to such turbines to cause such turbines to operate in such relationship that the first turbine stage operates during the highest portion of the speed range independently of any additional stage and wherein each additional stage using a lesser speed range designed operates with said highest speed turbine in steps of successively lower changing speed.

9. In a wide speed range gas power converter having a plurality of power turbine stages for driving an output shaft:

a series of turbine wheels at least one for each of said stages, each designed to operate at optimum output torque over a certain portion of a desired wide range of output shaft speed of rotation;

means to couple certain of said turbine wheels in drive relationship to said output shaft comprising overrunning clutch means affording a connection of each of said turbine wheels to drive said output shaft only when drive is from a turbine wheel to said shaft and said means to couple effective on all such turbine wheels in the said series except the wheel designed to operate over the highest speed portion of desired wide range of output speed of rotation;

individual control means responsive to rotative speed of each of said turbine wheels;

value means to direct and to shut off a driving gas flow selectively to certain of said turbine wheels responsive to said individual control means, so constructed and arranged that gas flow to individual turbine wheels is shut off when speed of rotation of such wheel exceeds the range of designed optimum output for such wheel.

10. In a wide speed range gas power converter having a driven shaft and a plurality of turbine stages comprising:

a first stage including a turbine wheel secured to rotate with said driven shaft;

one or more additional turbine stages each having a turbine wheel having a designed speed for most efficient operation in steps of successively lower speeds of rotation in portions of said wide speed range below the designed speed of said first stage turbine wheel;

a gas flow directing means for directing flow to selectively operate said turbine wheels;

control for said gas flow directing means so constructed and arranged as to cause the turbine wheel having designed speed for most efficient operation in a given portion of the speed range to be in driving relationship with the output shaft during the time such speed range is effective in said shaft;

overrunning clutch means positioned to couple said additional turbine wheels to said driven shaft only when drive is from the turbine wheel to said shaft;

whereby said overrunning clutch means assures that no turbine in said series is connected to drive such shaft when such shaft is rotating at a speed above that for which said turbine is designed for most efficient operation; and whereby the turbine most effective for the speed of rotation is in opeartion and no turbine is operating at a speed above that for which it is designed.

References Cited

UNITED STATES PATENTS

| 2,435,836 | 2/1948 | Johnson. | |
| 2,650,666 | 9/1953 | Dorand et al. | |
| 2,831,627 | 4/1958 | Brunner. | |
| 3,154,918 | 11/1964 | Kronogard | 60—39.16 |

FOREIGN PATENTS 704,669   2/1954   Great Britain.

EVERETTE A. POWELL, JR., Primary Examiner

U.S. Cl. X.R.

60—39.16